US011375669B2

(12) United States Patent
Hackert et al.

(10) Patent No.: US 11,375,669 B2
(45) Date of Patent: Jul. 5, 2022

(54) POSITIVE DRIVE WRAP DELIVERY SYSTEM (71) Applicant: Deere & Company, Moline, IL (US)

(72) Inventors: Ryan A. Hackert, Ankeny, IA (US); Jeffrey S. Wigdahl, Ames, IA (US); Scott D. Weber, Bondurant, IA (US)

(73) Assignee: Deere & Company, Moline, IL (US)

( * ) Notice: Subject to any disclaimer, the term of this patent is extended or adjusted under 35 U.S.C. 154(b) by 231 days.

(21) Appl. No.: 16/416,685

(22) Filed: May 20, 2019

(65) Prior Publication Data
US 2020/0367437 A1 Nov. 26, 2020

(51) Int. Cl.
A01F 15/08 (2006.01)
A01F 15/07 (2006.01)
B65B 41/12 (2006.01)
B65B 11/00 (2006.01)
B65B 27/12 (2006.01)
A01D 46/08 (2006.01)

(52) U.S. Cl.
CPC ........ A01F 15/0715 (2013.01); A01F 15/085 (2013.01); B65B 11/008 (2013.01); B65B 27/125 (2013.01); B65B 41/12 (2013.01); A01D 46/08 (2013.01); A01F 2015/0755 (2013.01)

(58) Field of Classification Search
CPC .............. A01F 15/0715; A01F 15/085; A01F 2015/0755
USPC ......................................................... 53/397
See application file for complete search history.

(56) References Cited

U.S. PATENT DOCUMENTS

| 645,805 A | 3/1900 | Graham |
| 4,333,301 A | 6/1982 | Koutonen et al. |
| 4,779,526 A | 10/1988 | Frerich et al. |
| 4,956,968 A | 9/1990 | Underhill |

(Continued)

FOREIGN PATENT DOCUMENTS

| CN | 101422107 A | 5/2009 |
| CN | 202979706 U | 6/2013 |

(Continued)

OTHER PUBLICATIONS

MRFULLEN, 7760 John Deere-Animacao Do Conceito, Apr. 4, 2011, Retrieved from the Internet: <URL: https://www.youtube.com/watch?v=JyD1c_a-all>.

(Continued)

Primary Examiner — Chelsea E Stinson
(74) Attorney, Agent, or Firm — Taft Stettinius & Hollister LLP; Stephen F. Rost (57) ABSTRACT A module builder includes a wrap floor system including a wrap floor belt wrapped around a front belt sheave and a first drive system coupled to the wrap floor system. The first drive system includes a main drive belt coupled to a rear belt sheave and the front belt sheave, wherein in an engagement mode of operation the main drive belt is tensioned to rotate the rear belt sheave, and in a disengagement mode of operation the main drive belt loses tension to cease rotation of the rear belt sheave. The builder includes a second drive system coupled to a baler belt to drive the baler belt into a module forming chamber. The first drive system further includes one or more of a rear lower gate roller, friction wheel, wrap box roller, electric clutch, or motor to engage and drive the main drive belt.

14 Claims, 10 Drawing Sheets

(56) References Cited

U.S. PATENT DOCUMENTS

| | | |
|---|---|---|
| 4,969,315 A | 11/1990 | Ardueser et al. |
| 5,129,207 A | 7/1992 | Butler |
| 5,129,208 A | 7/1992 | Van Zee |
| 5,152,123 A | 10/1992 | Viaud et al. |
| 5,349,806 A | 9/1994 | Swearingen et al. |
| 5,519,988 A | 5/1996 | Copley et al. |
| 5,557,906 A | 9/1996 | Viaud |
| 5,687,548 A | 11/1997 | McClure et al. |
| 5,727,359 A | 3/1998 | Rampp |
| 5,729,953 A | 3/1998 | Fell et al. |
| 5,979,141 A | 11/1999 | Phillips |
| 6,006,504 A | 12/1999 | Myers et al. |
| 6,032,446 A | 3/2000 | Gola et al. |
| 6,050,052 A | 4/2000 | Herron et al. |
| 6,421,992 B1 | 7/2002 | Goering et al. |
| 6,421,996 B1 | 7/2002 | Deutsch et al. |
| 6,453,805 B1 | 9/2002 | Viaud et al. |
| 6,591,743 B2 | 7/2003 | Deutsch et al. |
| 6,941,740 B2 | 9/2005 | Fox et al. |
| 6,966,162 B2 | 11/2005 | Viaud et al. |
| 7,694,491 B2 | 4/2010 | Noonan et al. |
| 8,069,638 B2 | 12/2011 | Wigdahl et al. |
| 8,087,216 B2 | 1/2012 | Noonan et al. |
| 2001/0003236 A1 | 6/2001 | Viaud |
| 2001/0013214 A1 | 8/2001 | Viaud |
| 2001/0047640 A1 | 12/2001 | Schaefer |
| 2004/0089167 A1 | 5/2004 | Viaud |
| 2004/0250702 A1 | 12/2004 | McHale et al. |
| 2006/0150582 A1* | 7/2006 | Paillet .................. A01F 15/0715 53/507 |
| 2007/0081878 A1 | 4/2007 | McHale et al. |
| 2007/0240389 A1 | 10/2007 | Frerichs |
| 2008/0282662 A1 | 11/2008 | Viaud et al. |
| 2009/0107349 A1 | 4/2009 | Noonan et al. |
| 2009/0240389 A1 | 9/2009 | Nomura et al. |
| 2009/0249746 A1 | 10/2009 | Viaud |
| 2010/0024357 A1 | 2/2010 | Viaud |
| 2010/0192516 A1 | 8/2010 | Olander |
| 2012/0042792 A1 | 2/2012 | Smith |
| 2012/0060444 A1 | 3/2012 | Reijersen Van Buuren |
| 2012/0073455 A1 | 3/2012 | Vandamme |
| 2012/0090273 A1 | 4/2012 | Reijersen Van Buuren |
| 2012/0090274 A1 | 4/2012 | Reijersen Van Buuren |
| 2012/0204735 A1 | 8/2012 | Claeys et al. |
| 2012/0210886 A1 | 8/2012 | Reijersen Van Buuren |
| 2012/0233963 A1 | 9/2012 | Chapon et al. |
| 2012/0240517 A1 | 9/2012 | Chapon et al. |
| 2012/0240527 A1 | 9/2012 | Herron |
| 2012/0266763 A1 | 10/2012 | Foster et al. |
| 2012/0311961 A1 | 12/2012 | Reijersen Van Buuren |
| 2012/0318152 A1 | 12/2012 | Nes |
| 2013/0104754 A1 | 5/2013 | Van Amstel et al. |
| 2014/0260090 A1 | 9/2014 | Smith et al. |
| 2015/0047311 A1* | 2/2015 | Jacobson ............ A01F 15/0715 56/341 |
| 2016/0353664 A1 | 12/2016 | Weber et al. |
| 2016/0353665 A1 | 12/2016 | Hummel et al. |
| 2016/0355292 A1 | 12/2016 | Wigdahl et al. |

FOREIGN PATENT DOCUMENTS

| | | |
|---|---|---|
| EP | 1205102 A2 | 5/2002 |
| WO | WO03039240 A1 | 5/2003 |
| WO | WO2005009112 A2 | 2/2005 |
| WO | WO2012027504 A2 | 3/2012 |
| WO | WO2012057612 A2 | 5/2012 |

OTHER PUBLICATIONS

Images showing wrap device for round module builder, 1 page, Admitted as prior art before Aug. 14, 2013.

John Deere 7760 Cotton Picker [online] 2013, [retrieved Jun. 20, 2013] Retrieved from the Internet: <URL: http://www.deere.com/wps/dcom/en_US/products/equipmenl/cotton_harvesting/7760_cotton_picker/77 60_cotton_picker.page?>.

Chinese Office Action and a brief translation of foreign office action (CN) for application No. 201410396458.3, dated Mar. 29, 2018. (18 pages).

Chinese Office Action and a brief translation of foreign office action (CN) for application No. 201410396458.3, dated Jul. 7, 2017. (17 pages).

Australian Examination Report No. 1 for application No. 2014210576, dated Apr. 7, 2017. (3 pages).

* cited by examiner

POSITIVE DRIVE WRAP DELIVERY SYSTEM

FIELD OF THE DISCLOSURE

The present disclosure relates to a wrap delivery system for a round module builder, and in particular, to a positive drive wrap delivery system.

BACKGROUND OF THE DISCLOSURE

Round module builders or balers use belts and rollers to manipulate harvested material into a desired form. A round hay baler and a round module builder for cotton both typically use belts under tension running on a series of rollers to compact the harvested material into a cylindrical shape. In the wrap system, a first or rear set of belts are on a roller that is driven mechanically by a gear interacting with the rollers contained in the wrap box of the module builder. A second or front set of belts are individually driven based on contact between the wrap floor belts and the round module builder (RMB/Baler) belts. The belts operate on a set of belt sheaves and are not mechanically driven, but rely on friction. To apply enough force to generate adequate friction to drive these belts there are typically a set of cam plates that react against the main vehicle chassis. A common problem with this system is that it requires a certain force to generate movement, and if that force is too low, the belts will not turn and wrap mis-feeds occur. Another problem is the position of the front belt sheaves are in a way that when the force is generated, the baler belt joint laces can damage the belt sheaves. Once these sheaves become damaged, they can in turn damage the wrap floor belt resulting in total failure of the belt or deterioration of system function. Additional concerns that users of balers have is wrap economy and wrap feed reliability.

Thus there is a need for improvement for wrap delivery systems.

SUMMARY

According to one embodiment of the present disclosure, a module builder, comprising: a wrap floor system, wherein the wrap floor system includes a wrap floor belt wrapped around a front belt sheave, wherein rotation of the front belt sheave moves the wrap floor belt; and a first drive system coupled to the wrap floor system, the first drive system including a main drive belt coupled to a rear belt sheave and the front belt sheave, wherein in an engagement mode of operation the main drive belt is tensioned to rotate the rear belt sheave, and in a disengagement mode of operation the main drive belt loses tension to cease rotation of the rear belt sheave.

In one example, the module builder further comprises a baler belt operable in a module forming chamber; and a second drive system coupled to the baler belt, wherein the second drive system is configured to rotationally drive the baler belt into the module forming chamber.

In a second example, the module builder further comprises a wrap assembly that stores a wrap roll of wrapping material, wherein the wrap assembly is configured to dispense the wrapping material from the wrap roll between the baler belt and the wrap floor belt; and wherein the engagement of the wrap floor belt to the baler belt drives the wrap material into the module forming chamber.

In a third example, the first drive system further includes a rear lower gate roller configured to engage and drive the main drive belt.

In a fourth example, the first drive system further includes a friction wheel configured to engage and drive the main drive belt.

In a fifth example, the first drive system includes at least one wrap box roller to engage and drive the main drive belt.

In a sixth example, the first drive system includes a plurality of interoperable gears to engage and drive the main drive belt.

In a seventh example, the first drive system includes a motor operably attached to engage and drive the main drive belt.

In an eighth example, the wrap floor belt includes a plurality of wrap floor belts that are operated by the first drive system.

According to another embodiment of the present disclosure, a module builder, comprising: a baler belt operable in a module forming chamber; a first drive system coupled to the baler belt, wherein the first drive system includes a rear lower gate roller configured to rotationally drive the baler belt into the module forming chamber; a wrap floor system includes a wrap floor belt wrapped around a front belt sheave, wherein rotation of the front belt sheave moves the wrap floor belt; and a second drive system configured to engage the front belt sheave to drive the wrap floor system and to rotationally move the wrap floor belt, the second drive system coupled to the rear lower gate roller, wherein in an engagement mode of operation the rear lower gate roller engages the second drive system to rotate the front belt sheave, and in a disengagement mode of operation the rear lower gate roller disengages from the second drive system to cease rotation of the front belt sheave.

In one example of this embodiment, the drive system further includes a friction wheel coupled to the rear lower gate roller to rotationally drive the rear lower gate roller.

In a second example of this embodiment, further comprising: a wrap assembly that stores a wrap roll of wrapping material, wherein the wrap assembly is configured to dispense the wrapping material from the wrap roll between the baler belt and the wrap floor belt; and wherein the engagement of the wrap floor belt to the baler belt drives the wrap material into the module forming chamber.

In a third example of this embodiment, the second drive system includes a plurality of interoperable gears to engage and drive the front belt sheave.

In a fourth example of this embodiment, the second drive system includes a motor operably attached to engage and drive the front belt sheave.

In a fifth example of this embodiment, the second drive system includes a main drive belt coupled to a rear belt sheave and the front belt sheave, wherein in an engagement mode of operation the main drive belt is tensioned to rotate the rear belt sheave, and in a disengagement mode of operation the main drive belt loses tension to cease rotation of the rear belt sheave. In a further refinement, the second drive system includes a drive sprocket coupled to a driven sprocket wherein the driven sprocket is rotationally coupled to the lower rear gate roller. In yet another refinement, further comprising: a tensioner configured to engage the main drive belt to tension the main drive belt in the engagement mode of operation. In yet another refinement, the tensioner is positioned partially between the drive sprocket and the driven sprocket.

In a sixth example of this embodiment, the wrap floor system pivots to engage the baler belt during the engagement mode of operation.

In a seventh example of this embodiment, the second drive system includes an electric clutch configured to operationally engage the rear lower gate roller.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
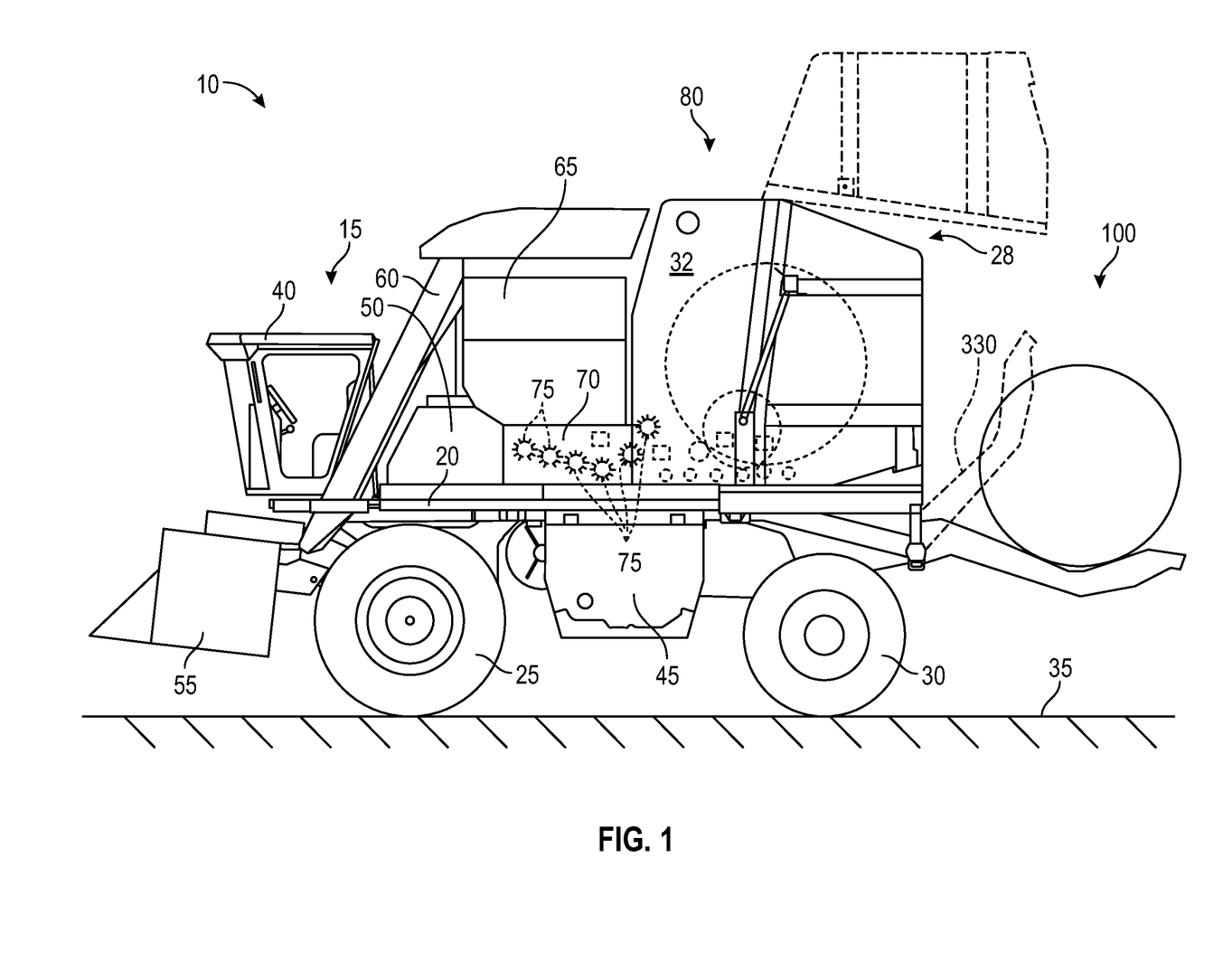
FIG. 1 is a side view of a cotton harvester.

FIG. 1 illustrates a harvester 10 according to one embodiment. The illustrated harvester 10 is a cotton harvester 15. Alternatively, the harvester 10 may be any type of work machine that utilizes a wrapping assembly.

The harvester 10 includes a chassis 20. The chassis 20 is supported by front wheels 25 and rear wheels 30. The harvester 10 is adapted for movement through a field 35 to harvest cotton or other crop. An operator station 40 is supported by the chassis 20. A power module 45 may be supported below the chassis 20. Water, lubricant, and fuel tanks, indicated generally at 50, may be supported on the chassis 20.

A harvesting structure 55 is coupleable to the chassis 20. The illustrated harvesting structure 55 is configured to remove cotton from the field 35. Alternatively, the harvesting structure 55 may be configured to remove other crop. An air duct system 60 is coupleable to the harvesting structure 55. An accumulator 65 is coupleable to the air duct system 60. The accumulator 65 is configured to receive cotton, or other crop, from the harvesting structure 55 via the air duct system 60. A feeder 70 is coupleable to the chassis 20. The feeder 70 is configured to receive cotton, or other crop, from the accumulator 65. The feeder 70 includes a plurality of rollers 75 configured to compress the cotton, or other crop, and transfer the cotton, or other crop, to a round module builder 80. The round module builder 80 has a baler gate 28 and a baler front 32.

While a round module builder 80 is shown and described as part of a cotton harvester 15, this disclosure is not limited to such an application of a module builder. More specifically, other embodiments considered for this disclosure include, but are not limited to, a pull type round baler. A pull type round baler may not include a chassis, header, air system, and other components shown on the cotton harvester 15. Rather, the pull behind round baler may have a hitch, wheels, and a crop pickup assembly coupled to the round module builder. A person having skill in the relevant art understands how the teachings of this disclosure can be applied to any round-type baler or module builder and this disclosure is not limited in application to the cotton harvester 15 shown and described herein.

Figure 2:
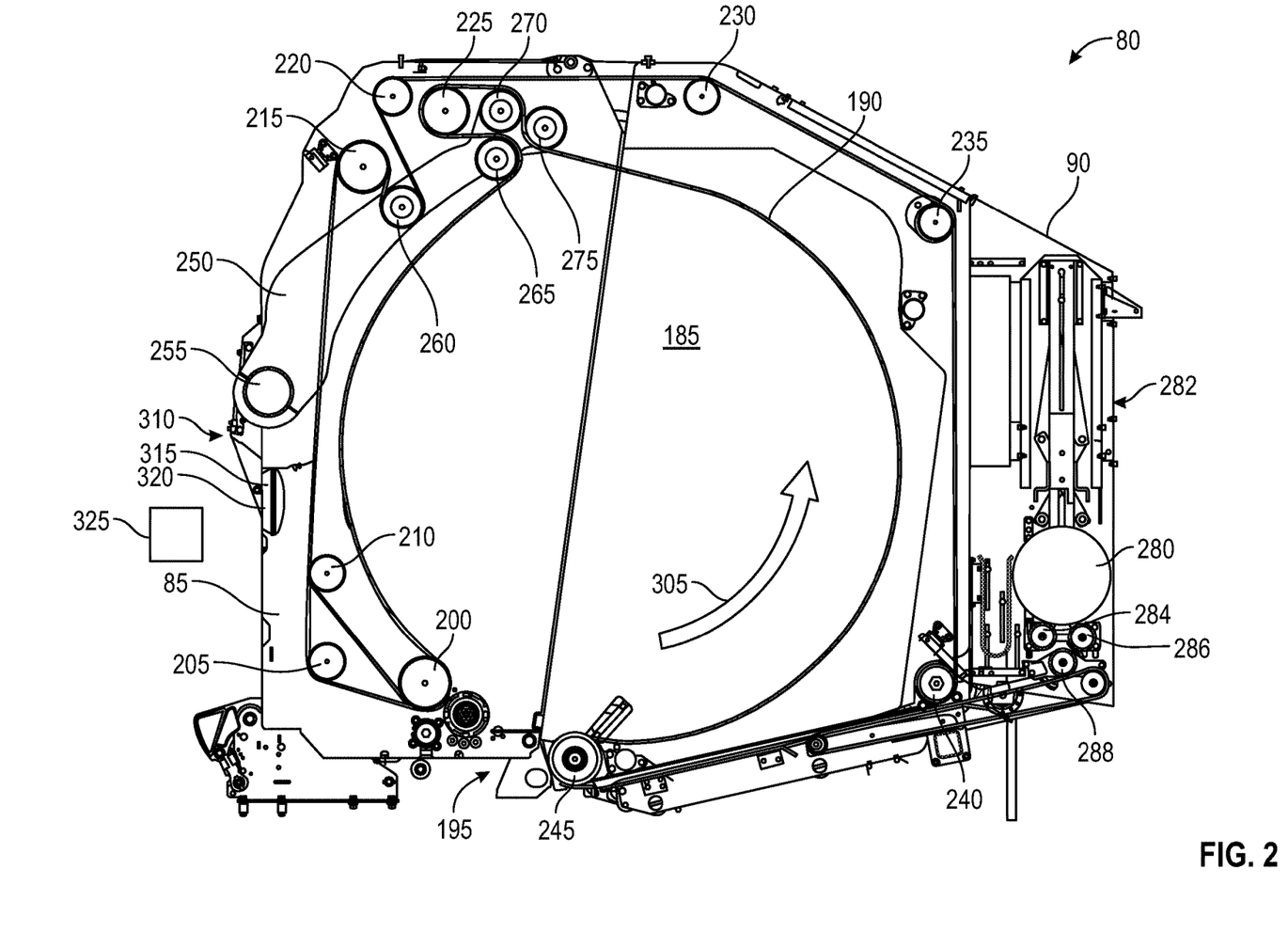
FIG. 2 is a cross-sectional side view of a round module builder.

Referring to FIG. 2, a module-forming chamber 185 may have a plurality of endless belts 190 define the circumference of the module-forming chamber 185. The plurality of endless belts 190 are supported in a side-by-side relationship across a support roll arrangement comprising a plurality of fixed rolls and a plurality of movable rolls. Specifically, proceeding clockwise from a chamber inlet 195 where crop enters the module-forming chamber 185, the fixed rolls include a lower drive roll 200, a first separation roll 205, a second separation roll 210, an upper drive roll 215, an upper front frame roll 220, an upper rear frame roll 225, an upper front gate roll 230, an upper rear gate roll 235, a lower rear gate roll 240, and a lower front gate roll 245 all coupled for rotation within the round module builder 80.

In FIG. 2, a conventional pair of transversely spaced belt tensioning or rockshaft arms 250 are pivotally mounted to a belt tensioning arm pivot 255. The plurality of movable rolls comprise a first movable roll 260, a second movable roll 265, a third movable roll 270, and a fourth movable roll 275, which extend between and have opposite ends, respectively, rotatably coupled to the transversely-spaced belt tensioning arms 250. As illustrated, one or more of the fixed rolls are driven to cause the plurality of endless baler belts 190 to be driven, with the drive direction being such as to cause the incoming cotton, or other crop, to travel counterclockwise as it is added as a spiral layer to a growing round module 100. As the round module 100 grows within the module-forming chamber 185, the transversely spaced belt tensioning arms 250 rotate counterclockwise until a round module 100 having a predetermined diameter has been formed in the module-forming chamber 185.

Along the rear portion of the round module builder 80 may be a wrapping assembly 90 that houses one or more wrap roll 280. In the embodiment illustrated in FIG. 2, only one wrap roll 280 is shown positioned in the wrapping assembly 90. However, the wrapping assembly 90 is configured to stack multiple wrap rolls 280 on top of one another within a wrap roll hopper 282. The bottom most wrap roll 280 may rest on a front carry roller 284 and a rear carry roller 286. The front and rear carry rollers 284, 286 may be coupled to a bracket (not particularly shown) that allows the front and rear carry rollers 284, 286 to move along a linear path towards, and away from, a lower wrap roller 288.

The wrap roll 280 may be a wrap material sized to cover the exterior circumference of a round module 100. The wrap material may transition from the wrap roll 280, partially around the front carry roller 284, between the front carry roller 284 and the lower wrap roller 288, partially around the lower wrap roller 188 and to the lower front gate roll 245. Once the wrap material enters the module forming chamber 185 at the lower front gate roll 245, the wrap material may follow the endless baler belts 190 about the circumference of the round module 100 until the outer periphery is substantially covered with wrap material. For hay and forage balers, a cutting assembly (not specifically shown) may then cut the wrap material from the wrap roll and the wrap material may adhere to the round module to substantially maintain its form once ejected from the module forming chamber. In the illustrated embodiment, the wrap material is sized for individual portions from the wrap roll 280 that do not require cutting device but are sized to adhere to the round module 100 to maintain its form once ejected from the module forming chamber 185.

In one aspect of the wrapping assembly 90 illustrated in FIG. 2, the wrap material is stretched as it extends between the lower wrap roller 288 and the lower front gate roll 245. More specifically, one or more of the front and rear carry rollers 284, 286 and the lower wrap roller 288 may be powered to feed wrap material from the wrap roll 280 to the module forming chamber 185. Further, the wrap material may be pinched between the front and rear carry rollers 284, 286 and the lower wrap roller 288 as it is fed from the wrap roll 280 to the module forming chamber 185.

The powered roller 284, 286, 288 may send the wrap material toward the lower front gate roll 245 at a feed speed. The feed speed may be slightly less than the speed required to match the rotation speed of the round module 100. In one non-limiting example, the round module may have a twenty-three foot circumference and thereby require approximately twenty-three linear feet of wrap material per rotation. However, the wrapping assembly 90 may only have a feed speed of twenty-two linear feet per rotation. In this embodiment, as the wrap material transitions from the wrap roll 280 to the module forming chamber 185, the wrap material is stretched as it moves between the lower wrap roller 288 and the lower front gate roll 245.

Stretching the wrap material as it transitions from the wrapping assembly 90 to the module forming chamber 185 may provide for a tightly packed round module 100 that has a high density and therefor transports a large amount of harvested crop. Further, the wrap material may compact the round module 100 so that it maintains the proper form. Properly covering the outer surface of the round module 100 may also inhibit moister from penetrating the outer surface of the round module 100. However, if the wrap material is not evenly distributed about the outer surface, the round module 100 may lose form and fall apart or become saturated with water or the like.

In one aspect of the embodiment illustrated in FIG. 2, the lower wrap roller 288 may be rotationally coupled to the round module builder 80 at a first wall and a second wall of baler front 32 or the baler gate 28. As the wrap material is stretched between the lower wrap roller 288 and the lower front gate roll 245, the central portion of the lower wrap roller 288 may deflect towards the lower front gate roll 245 responsive to the stretch force applied by the wrap material. This deflection or bowing of the lower wrap roller 288 may cause uneven distribution of the wrap material onto the round module 100. More particularly, the center portion of the wrap material may be tighter than the edge portions as the wrap material is distributed to the surface of the round module 100 or vice versa.

Referring back to FIG. 1, after the round module 100 is formed and wrapped, a module handling system 330 may receive the round module 100. The module handling system 330 temporarily supports the round module 100 and then discharges it from the harvester 10.

In operation, the harvester 10 is driven through the field 35 to harvest cotton or other crop. The illustrated harvesting structure 55 picks cotton from cotton plants in the field 35. Alternatively, the harvesting structure 55 may strip the cotton from the cotton plants. Cotton is transferred to the accumulator 65 via the air duct system 60. The accumulator 65 holds the cotton until a predetermined cotton level is reached and then transfers the cotton to the feeder 70. In an exemplary embodiment, the accumulator 65 transfers cotton to the feeder 70 approximately four times for each round module 100 produced. When the feeder 70 receives cotton, the plurality of rollers 75 are activated to distribute the cotton to a feed conveyor belt that transfers the cotton to the round module builder 80. The round module builder 80 uses the endless baler belts 90 to compress the cotton while forming the module 100.

After the round module builder 80 receives compressed cotton, the plurality of endless baler belts 190 rotate the cotton into the round module 100. After the round module builder 80 receives sufficient cotton from the feeder 70, the round module may be wrapped and the round module 100 can be ejected onto the module handling system 330. The module handling system 330 supports the round module 100 and then discharges it from the harvester 10. The harvester 10 is adapted for movement through a field 35 to harvest cotton.

Figure 3:
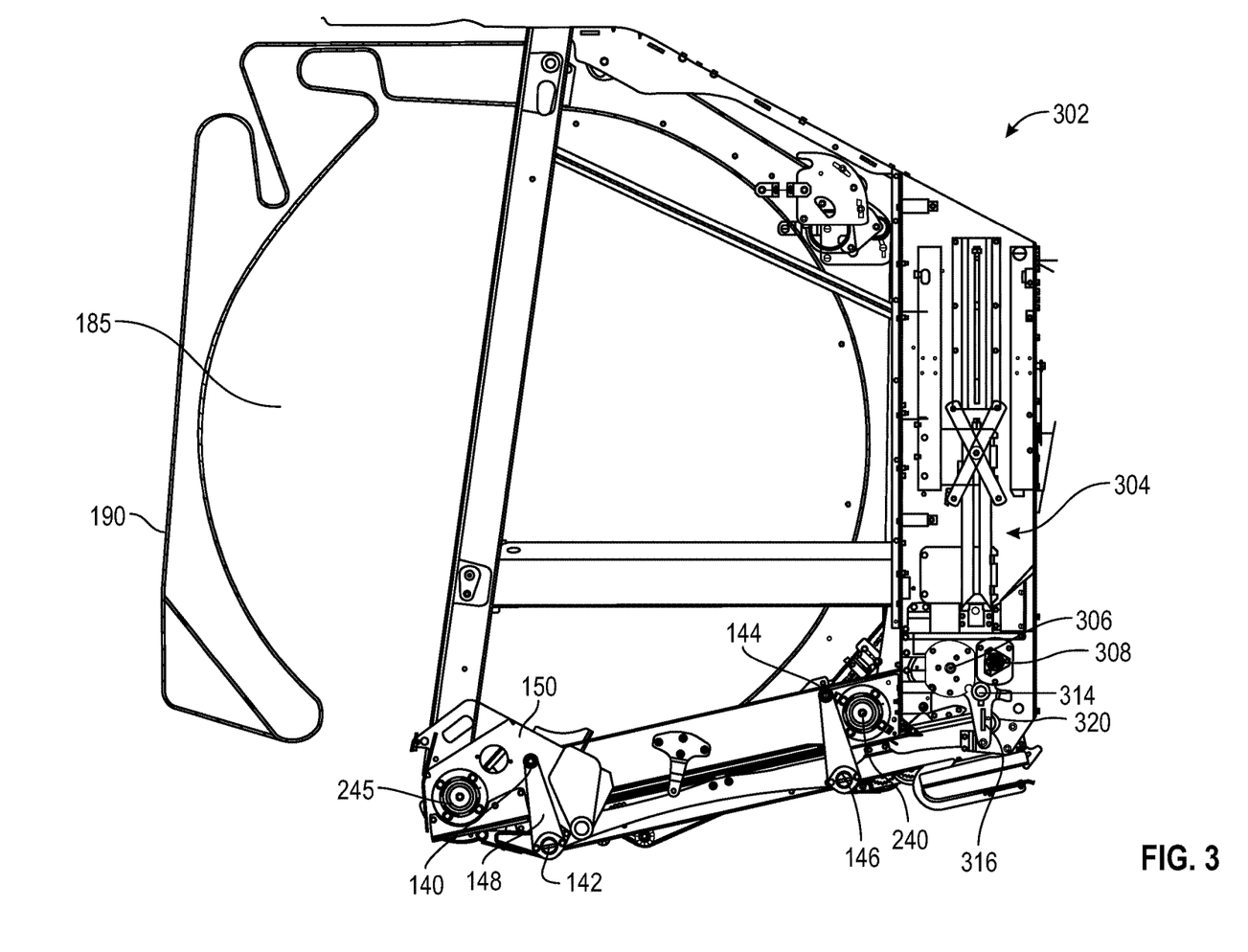
FIG. 3 is a cross-sectional view of a different embodiment of a wrapping assembly for a round module builder.
Figure 4A:
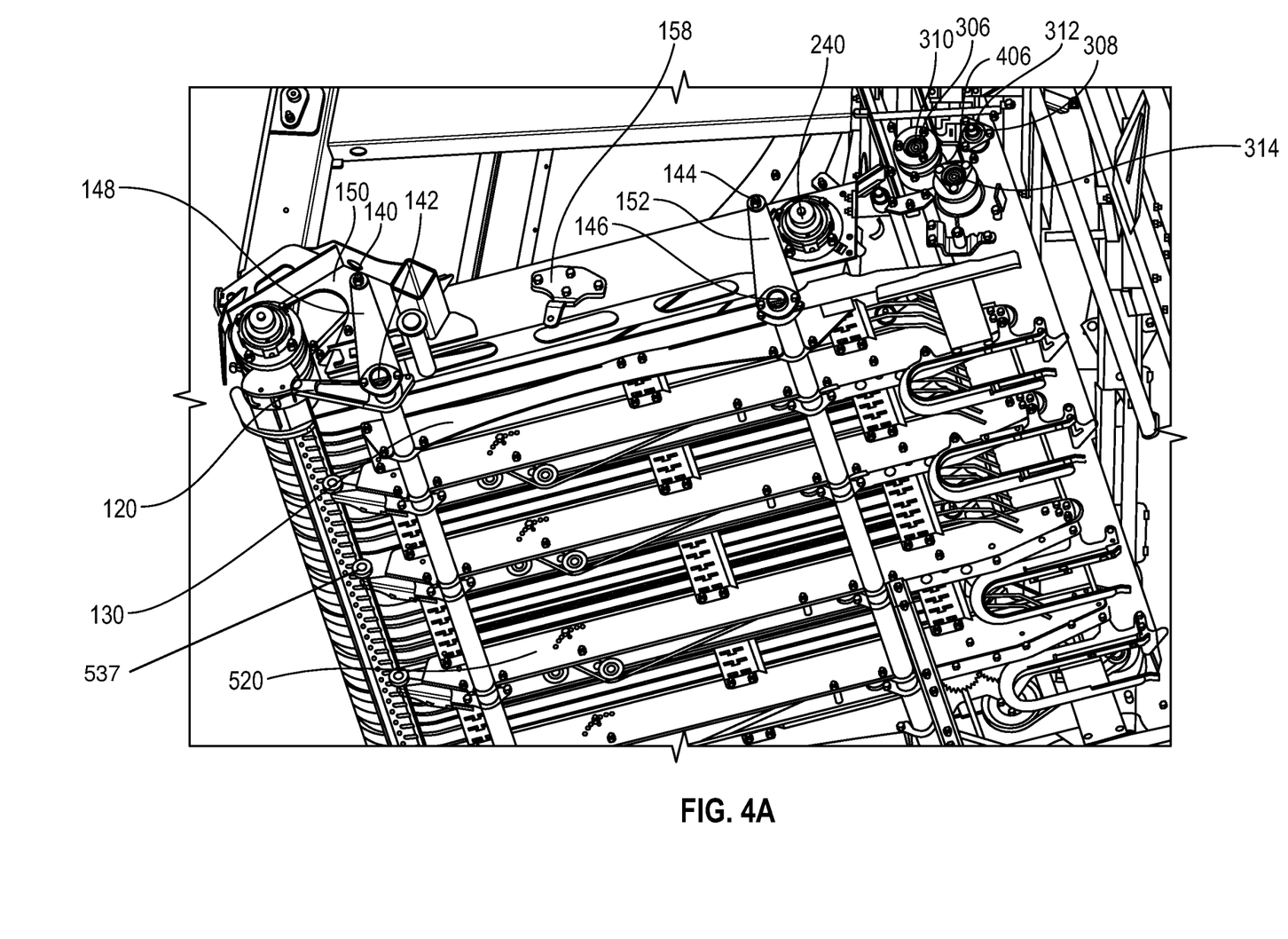
FIG. 4a is a bottom perspective view of a wrap floor system of the FIG. 3 embodiment.
Figure 4B:
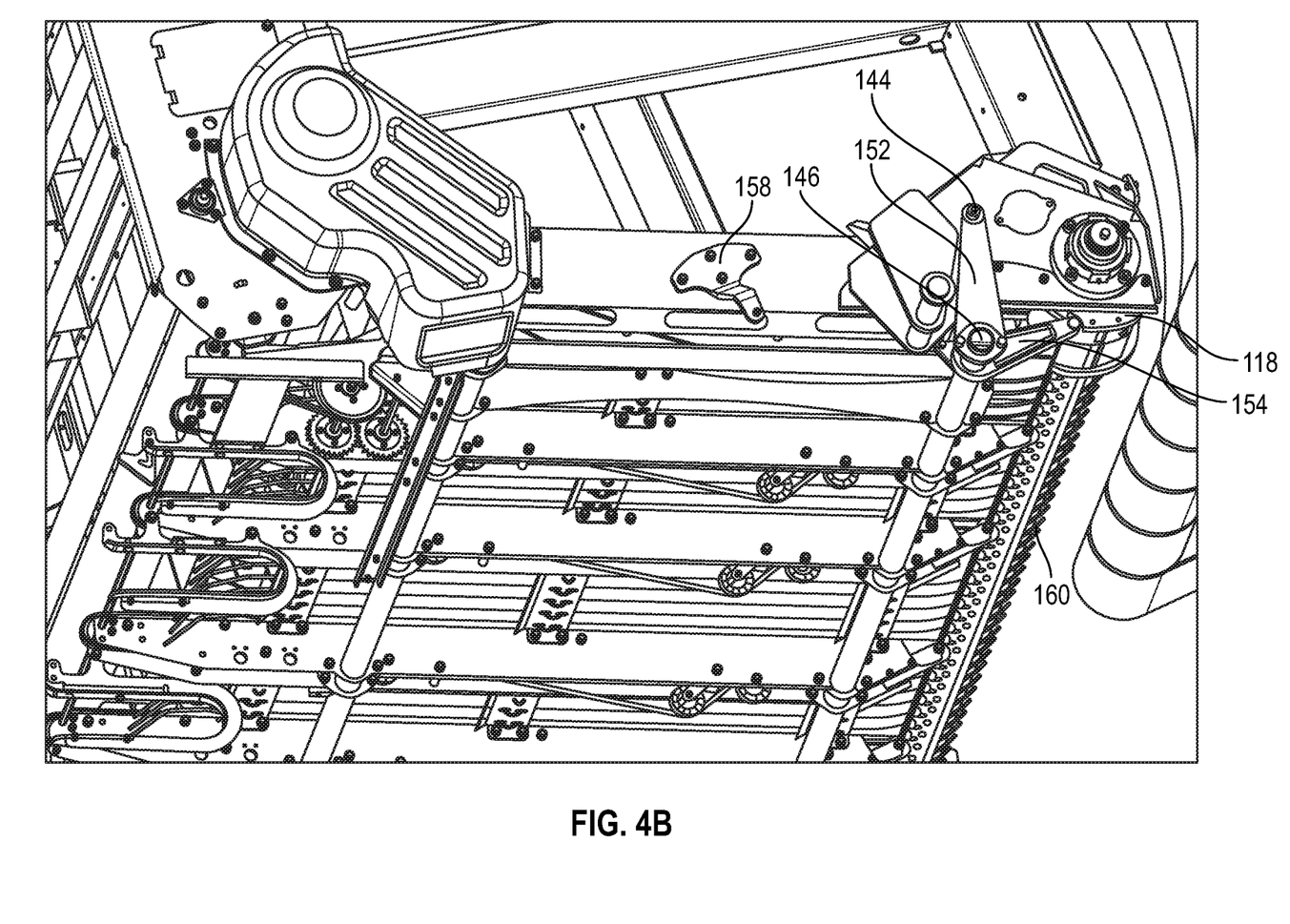
FIG. 4b is a bottom perspective view of a wrap floor system of the FIG. 3 embodiment.

Referring now to FIGS. 3, 4a, and 4b, a different embodiment of a wrapping assembly 302 is illustrated. More specifically, the wrapping assembly 302 may have a wrap roll hopper 304 similar to the wrap roll hopper 282 described above. The wrap roll hopper 304 may provide for storage for a plurality of wrap rolls wherein the bottom-most wrap roll contacts an upper front wrap roller 306 and a carry roller 308. Both the upper front wrap roller 306 and the carry roller 308 may be rotationally coupled to the first and second walls of 32 or 28 of the round module builder 80. The upper front wrap roller 306 may be rotationally coupled to the first and second side walls of 32 or 28 about a first axis 310 and the carry roller 308 may be rotationally coupled to the first and second side walls of 32 or 28 about a carry axis 312. Both the first axis 310 and the carry axis 312 may be defined through a fixed portion of the first and second side wall of 32 or 28. The first axis 310 and the carry axis 312 may not move relative to the first and second side walls of 32 or 28 or otherwise relative to the round module builder 80.

The wrapping assembly 302 may also have a lower wrap roller 314 that is positionable adjacent to the upper front wrap roller 306. The lower wrap roller 314 may be rotationally coupled between a first bracket 316 and second bracket 318. The first bracket 316 may be pivotally coupled to the first wall of 32 or 28 about a bracket axis 320 and the second bracket may be pivotally coupled to the second wall of 32 about the bracket axis 320.

The lower wrap roller 314 may be pivotal about the bracket axis 320 between a first position (as shown in FIG. 3), and a second position. In the first position, the outer surface of the lower wrap roller 314 may be positioned adjacent to the outer surface of the upper front wrap roller 306. More specifically, in the first position the wrap material may be pinched between the upper front wrap roller 306 and the lower wrap roller 314 at a pinch point 406 (see FIG. 4). Pinching the wrap material between the upper front wrap roller 306 and the lower wrap roller 314 allows the rotation speed of the rollers 306, 314 to partially control the feed speed as is described in more detail below.

In one aspect of the embodiment of FIG. 3, the outer surface of the upper front wrap roller 306 and the outer surface of the lower wrap roller 314 may be coated in a material that grips the wrap material such as rubber or the like. The outer surface of the rollers 306, 314 may then control the feed speed of the wrap material to the lower front gate roll 245 without allowing the wrap material to slip there between. In other words, the outer surface of the rollers 306, 314 may frictionally engage the wrap material as it is pinched between the respective rollers 306, 314 at the pinch point 406 and as it travels from the wrap roll to the module forming chamber 185. In this configuration, the stretch force generated on the wrap material between the lower front gate roll 245 and the lower wrap roller 314 may be insufficient to cause the wrap material to slip between the upper front wrap roller 306 and the lower wrap roller 314.

In one embodiment, a biasing member (not illustrated) such as a spring or the like may be positioned between the first and second bracket 316, 318 and the corresponding first and second walls of 32 or 28 to pivot the lower wrap roller 314 about the bracket axis 320 towards the upper front wrap roller 306. The force applied to the brackets 316, 318 by the biasing member may increase the pinch force on the wrap material and thereby reduce the likeliness of the wrap material slipping there between during heavy stretch forces.

The biasing member may be any type of spring or the like known in the art and is not limited to any particular type. More specifically, the biasing member may be generated by any type of mechanical, pneumatic, hydraulic, electrical or the like force. In one non-limiting example, the biasing member 402 is a coil spring. In another example, the biasing member is a hydraulic, pneumatic, or electrical actuator. A person having skill in the relevant art understands the many different types of biasing members 402 that can be utilized to bias a pivoting member about an axis and this disclosure is not limited to any particular one.

Figure 5:
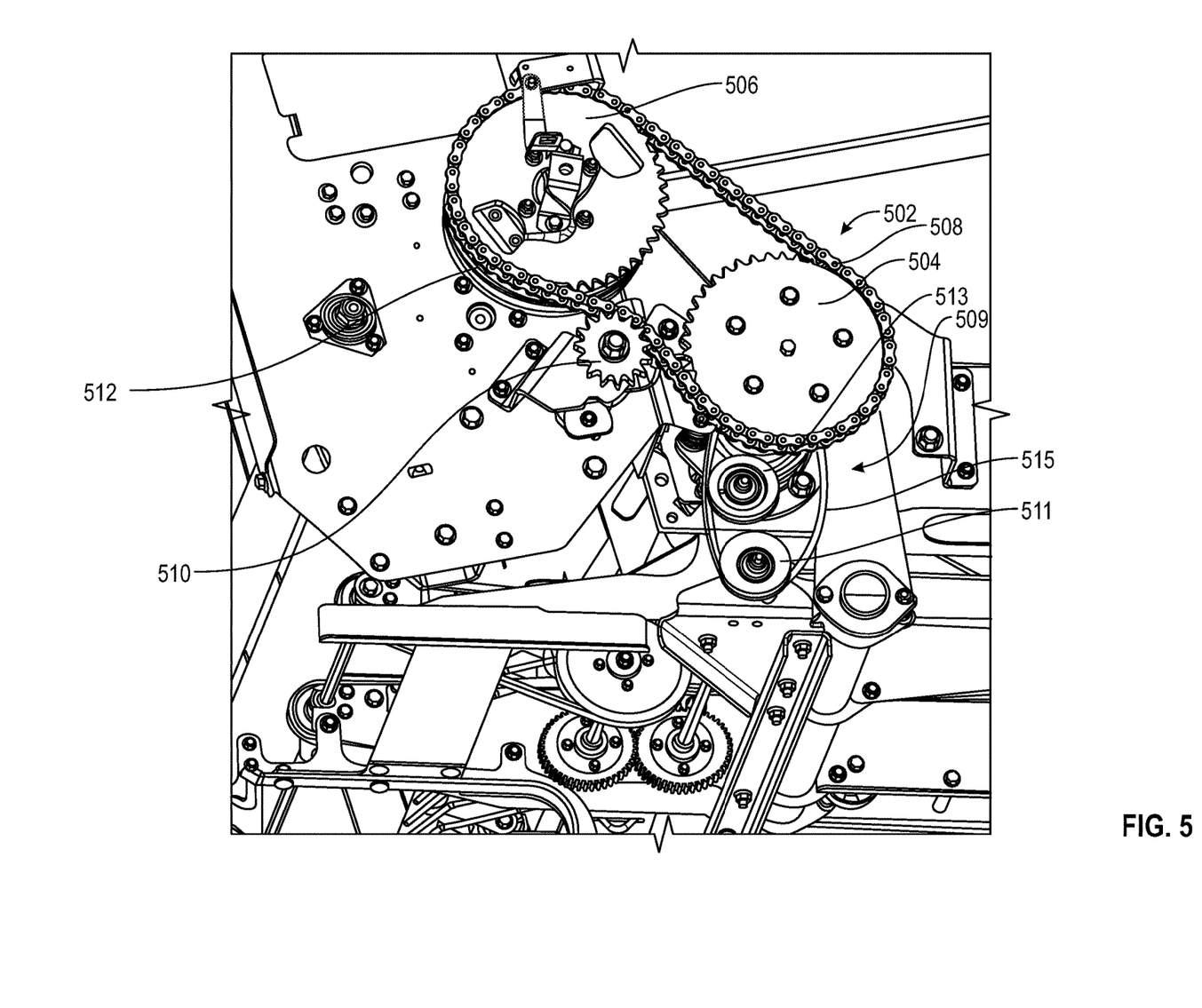
FIG. 5 is a perspective view of one embodiment of a drive system for the FIG. 3 embodiment.
Figure 6:
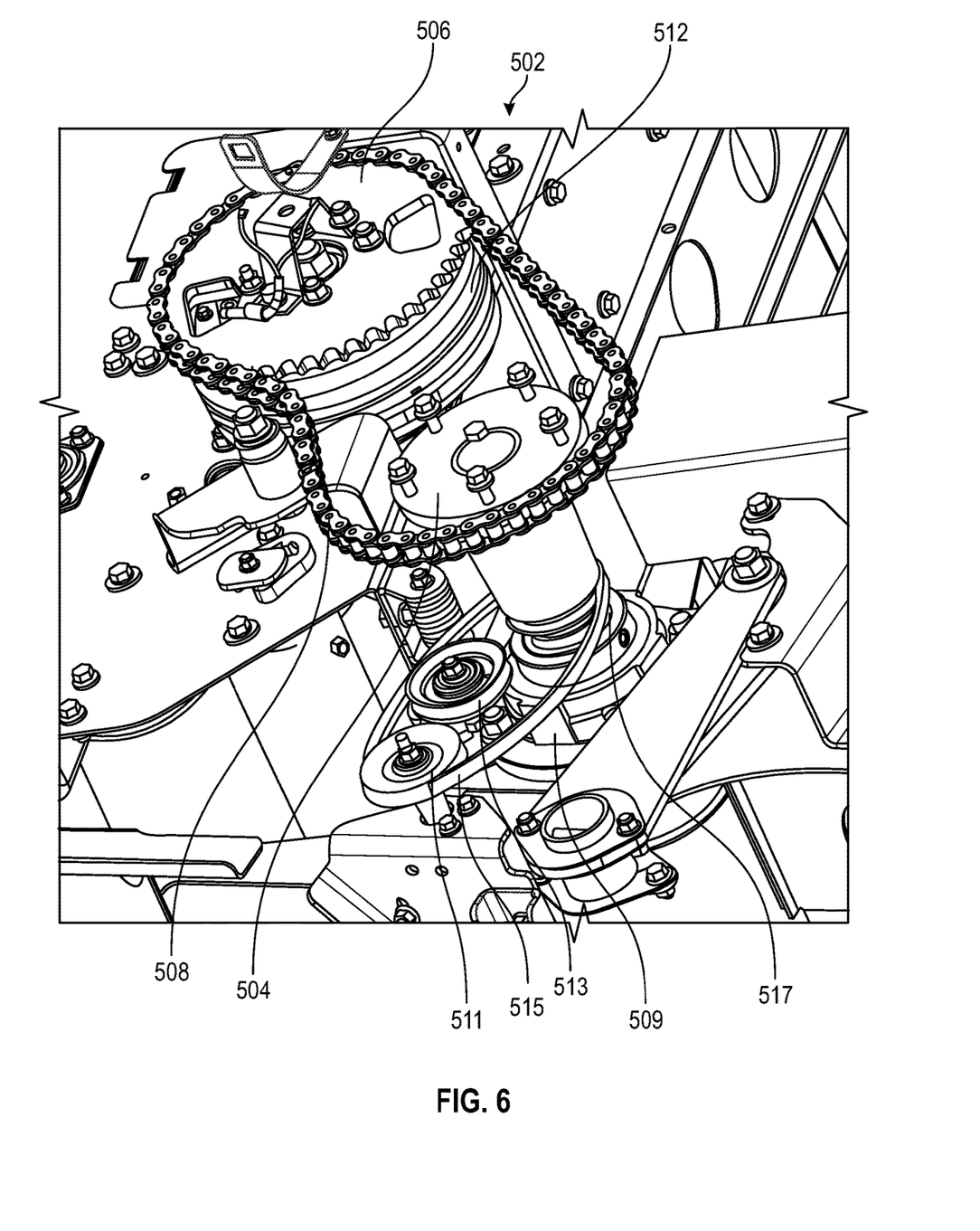
FIG. 6 is a another perspective view of the drive system from FIG. 5.
Figure 7:
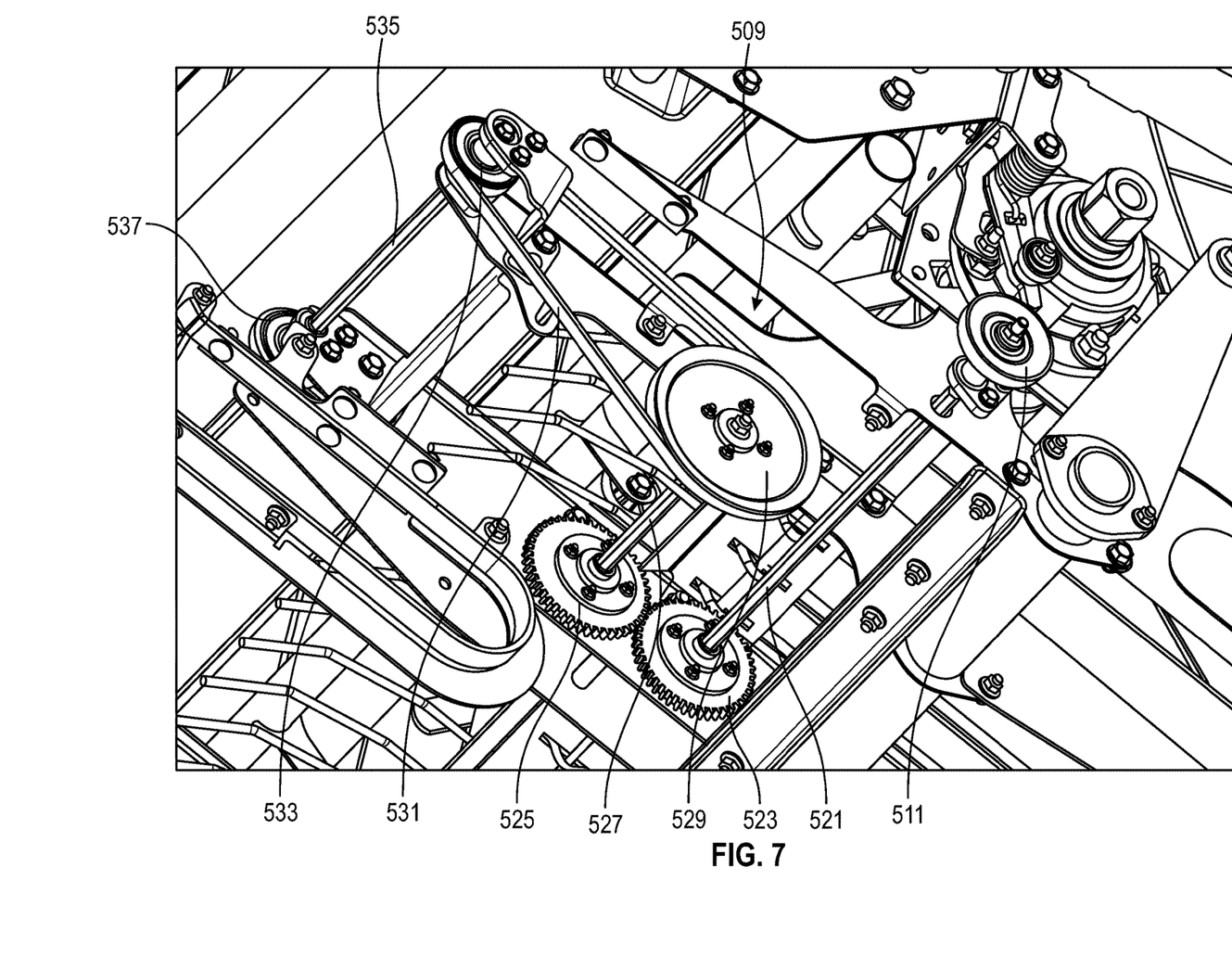
FIG. 7 is a bottom perspective view of the drive system from FIG. 5.

Referring now to FIGS. 5, 6, and 7, a first drive system 502 is illustrated. The first drive system 502 may have a drive sprocket 504 coupled to a driven sprocket 506 via a chain, belt, or the like 508. Further, a tensioner 510 may be positioned partially between the drive and driven sprocket 504, 506 to ensure the proper chain tension is maintained between the sprockets 504, 506. In one non-limiting embodiment, the drive sprocket 504 may be rotationally coupled to the lower rear gate roll 240 or any other roll of the module forming chamber 185. In this embodiment, the ratio of teeth of the sprockets 504, 506 may dictate the feed speed of the wrapping assembly 302 relative to the rotation speed of the rolls of the module forming chamber 185. In another non-limiting embodiment, the drive sprocket 504 may be rotationally coupled to a second drive system 509 which may be any type of system such as mechanical, pneumatic, hydraulic, electrical or the like that engages and rotates the drive sprocket 504.

In FIGS. 5, 6, and 7, one form of the second drive system 509 includes a first roller 511 offset a second roller 517 and a tensioner belt 515 that wraps around the first and second rollers 511 and 517 to drive a shaft 521 of the drive sprocket 523. The belt is tensioned by the roller 513 when the wrap floor engages. Other forms of the second drive system 509 can include a friction wheel driven wrap system, one or more gears that engage shaft 521 or drive sprocket 523 to generate the input motion, a chain and sprocket arrangement, one or more of the wrap box rollers, and an electric clutch, to name a few examples.

In FIG. 7, the first roller 511 includes a shaft 521 operationally attached to a drive sprocket 523 that is coupled to a driven sprocket 525 through a series of teeth on each of the sprockets 523, 525 that engage each other. The driven sprocket 525 includes a shaft 527 that is operationally connected to a rear belt sheave 529. The rear belt sheave 529 receives a tensioner belt 531 that wraps around the rear belt sheave 529 and a wrap floor sheave 533 to drive a shaft 535 of a second wrap floor sheave 537. A wrap floor system 520, further described below, includes one of the second wrap floor sheaves 537 associated with each wrap floor belt wherein each of the second wrap floor sheaves 537 is assembled with the shaft 535 that extends across a width of the wrap floor system 520.

The driven sprocket 506 may have a shaft (not particularly shown) coupling the driven sprocket 506 to a drive gear 512 of the first drive system 502. The drive gear 512 may further be in contact with the upper front wrap roller 306 that is in turn selectively in contact with the lower wrap roller 314.

When the rollers 306, 314 are in the first position, the rotational movement of the lower rear gate roll 240 rotates the drive sprocket 504. The rotation of the drive sprocket 504 is transferred to the driven sprocket 506 through the chain 508. From the driven sprocket 506 the shaft rotates the drive gear 512. The drive gear 512 rotates the corresponding upper front wrap roller 306 and the lower wrap roller 314. Rotation of the drive sprocket 504 also activates the second drive system 509 such that the shaft 535 and the second wrap floor sheave 537 rotate.

While the drive gear 512 is described as powered through a mechanical linkage to the lower rear gate roll 240, the drive gear 512 or the upper front wrap roller 306 and the lower wrap roller 314 may be independently powered. More specifically, hydraulic, pneumatic, electrical, or the like motors may be coupled directly to any one of the above-mentioned rollers, gears, or sprockets to provided rotational power thereto. In this embodiment, a controller may communicate with the motor of the respective roller, gear, or sprocket to dictate the feed speed generated by the wrapping assembly 302.

A wrap floor system 520 is positioned partially between the wrapping assembly 302 and the module forming chamber 185. The wrap floor 520 may have a plurality of continuous wrap belts 522 or the like positioned thereon. The wrap belts 522 and the wrap floor 520 may guide the wrap material, in part, from the wrap roll to the lower front gate roll 245 and ultimately into the module forming chamber 185.

The carry roller 308 may not be directly coupled to the first drive system 502. Rather, the carry roller 308 may be free to rotate as the wrap roll placed thereon rotates. In other words, the carry roller 308 may be an idler roller that supports the wrap roll while simultaneously allowing the wrap roll to rotate as wrap material is fed to the module forming chamber 185. Further, the carry roller 308 may be spaced from the upper front wrap roller 306 to provide a cradle or the like between the rollers 306, 308 to allow the wrap roll to sit thereon. The rollers 306, 308 may maintain the proper positioning of the wrap roll while facilitating rotation as directed by the first drive system 502.

Figure 8:
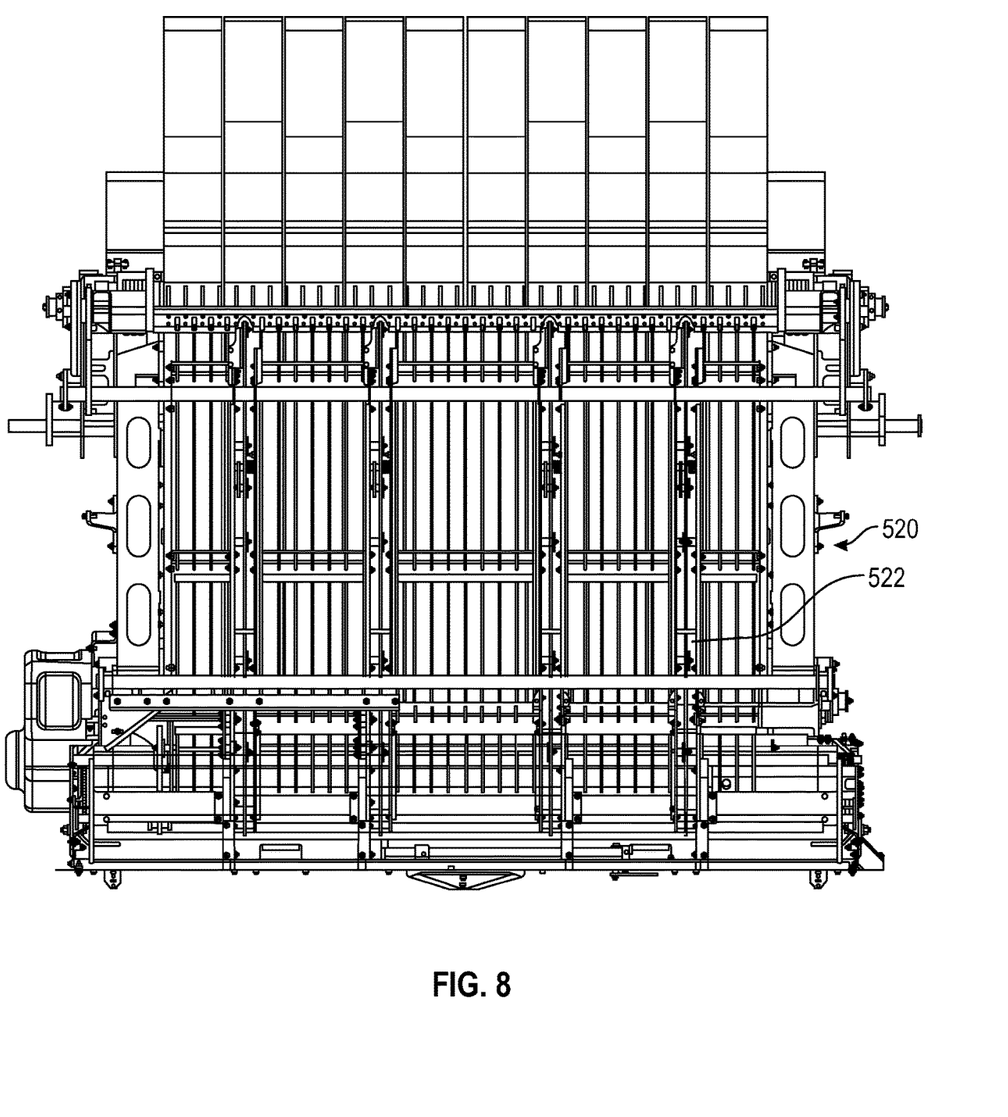
FIG. 8 is bottom view of the wrap floor system of the FIGS. 4a and 4b.

As further illustrated in FIGS. 4a, 4b, and 8, the wrap floor system 520 includes a plurality of wrap floor frame supports 130 which provides support for the wrap floor belts 522, which are located beneath the round module builder or endless baler belts 190 which move along the wrap floor belt 522, the lower rear gate roll 240, and the lower front gate roll 245, as would be understood by those skilled in the art. The wrap floor system 520 moves generally longitudinally along the length of the harvester 10 in response to an actuator (not illustrated). A wrap is moved between the wrap floor belt 522 and the module builder belt to wrap the cotton to provide a cotton module.

The wrap floor system 520 is configured to move longitudinally as well as to rotate about a four bar linkage having a first axis of rotation 140, a second axis of rotation 142, a third axis of rotation 144, and a fourth axis of rotation 146. The first axis of rotation 140 is located at one end of a bar 148 which is rotatably coupled to a stationary frame member 150. The second axis of rotation is located at another end of the bar 148. The third axis of rotation 144 is located at one end of a bar 152 rotatably coupled to a second bar 154. The fourth axis of rotation 146 is located at another end of the bar 152 which also identifies a rotation axis of the second bar 154.

The second bar 154 extends from the axis 146 to the bar 118 and is coupled to an actuator (not illustrated) which is coupled to a fixed bracket 158. Movement of the actuator engages and disengages bar 118 and thus the wrap floor system 520 with the endless baler belts 190.

In one embodiment, the actuator is a hydraulic actuator which is coupled to a valve (not shown), the function of which is controlled by a controller, such as a processor device, which when instructed, moves the hydraulic cylinder to start a wrap cycle. The controller includes a memory configured to store program instructions and the processor device is configured to execute the stored program instructions to adjust the position of the hydraulic cylinder.

Movement of the wrap floor system 520, which includes the frame supports 130, is generally along a longitudinal axis defined by the plane of the belt 522. The second bar 154, however, moves in both a longitudinal direction as well as an upward or inclined direction with the lower rear gate roll 240 due to its four bar linkage configuration. The actuator pushes the second bar 154, and consequently the bar 118 forward to the engaged position illustrated in FIGS. 4a and 4b. When the wrap is completed, the actuator pulls the bar 118 to a disengaged position and the wrap floor system 520 returns to an unengaged position.

The bar 118 also supports a plurality of wrap fingers 160 which are fixedly coupled to and extend from the bar 118. Upward movement of the bar 118 directs the wrap finger 160 upwardly as well.

The second drive system 509 uses a positive drive source. In the illustrated embodiments, the wrap floor system 520 includes a single set of wrap floor belts 522 as compared to traditional systems that include two sets of wrap floor belts that work together. In the illustrated embodiment, the rear lower gate roller 240 is used to generate the input motion. The preferred embodiment is driven by the rear lower gate roller 240, but any roller in the baler system could be used to generate the input motion. The tensioner belt 515 is tensioned when the wrap floor system 520 engages for the wrap cycle, and loses tension once the wrap floor system 520 disengages to cease the belt rotation. The input motion is then translated through a system of gears and belts to drive the rear belt sheave 529 of the wrap floor system 520. The second drive system 509 does not require any friction contact between the wrap floor belts 522 and the baler belts 190 to generate rotation of the wrap floor belts 520. Without the need for friction, the front or second belt sheave 537 is in a location that reduces or eliminates the damage created by the endless baler belts 190 connecting component, sometimes referred as baler belt joint splices. The tensioner belt 53 can be tensioned by an automatic tension system that would allow dimensional changes in the system over time and use.

An alternative embodiment is a friction wheel driven wrap system. In this embodiment, there is a wheel of some material (plain steel, rubber, anti-slip type or coarse surface texture, etc.) that contacts rear lower gate roller 240 to generate the input motion. When the wrap floor system 520 engages, the friction wheel would drive the wrap floor sheaves 533, 537 similar to the illustrated embodiment. This could be translated through a series of belts, chains and sprockets, gears or a directly driven shaft.

Alternatively, an individual stand-alone motor or any other type of drive input could be used to drive the wrap floor system 520 and the wrap floor belts 522. In yet another form, the drive input could include the rollers in the wrap box.

Figure 9:
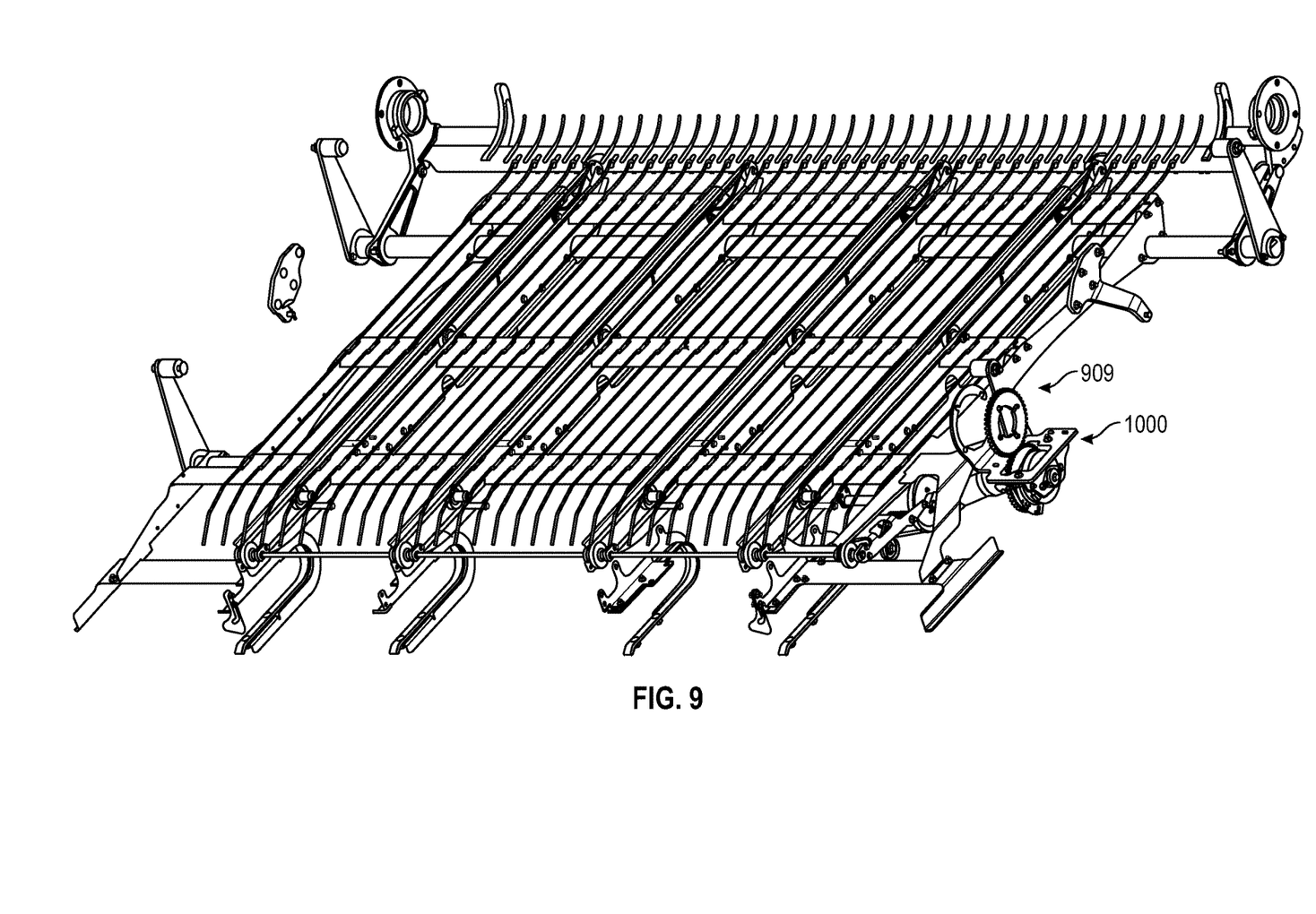
FIG. 9 is another embodiment of a second drive system.

Illustrated in FIG. 9, is yet another embodiment of a second drive system 909 is illustrated. The second drive system 909 also uses an input from the rear lower gate roller 240 (not illustrated) to generate rotation. The second drive system 909 includes an electric clutch 1000 which would initially turn while the rear lower gate roller 240 is turning but is not engaged. When the wrap cycle begins, it sends an electrical signal (current) to the electric wrap clutch to engage the clutch. The clutch then creates input rotation through a telescoping driveshaft to the secondary wrap floor drive turning the wrap floor belts 522 (not illustrated). The telescoping driveshaft is to allow the wrap floor to move through its range during the engage and disengaged motions. When the wrap floor cycle is disengaged, the electrical signal is turned off and the clutch also disengages halting the rotation of the secondary drive and the main wrap floor belts. In this embodiment, the wrap clutch is directly driven through a set of gears as the direction needs to be reversed so the baler belts and wrap floor belts are moving in the same direction. A set of belts, chain and sprocket, or some other type of drive to generate the input to the clutch from a different location in the round module builder 80 could be used.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A module builder, comprising:
 a wrap floor system, wherein the wrap floor system includes a wrap floor belt wrapped around a front belt sheave, wherein rotation of the front belt sheave moves the wrap floor belt; and
 a first drive system coupled to the wrap floor system, the first drive system including a main drive belt coupled to a rear belt sheave and the front belt sheave, wherein in an engagement mode of operation the main drive belt is tensioned to rotate the rear belt sheave, wherein rotation of the rear belt sheave thereby rotates the front belt sheave, and in a disengagement mode of operation the main drive belt loses tension to cease rotation of the rear belt sheave, wherein cessation of rotation of the rear belt sheave also ceases rotation of the front belt sheave.

2. The module builder of claim 1, further comprising:

a baler belt operable in a module forming chamber; and a second drive system coupled to the baler belt, wherein the second drive system is configured to rotationally drive the baler belt into the module forming chamber.

3. The module builder of claim 2, wherein the wrap floor system pivots to engage the baler belt during the engagement mode of operation.

4. The module builder of claim 1, further comprising:

a wrap assembly that stores a wrap roll of wrapping material, wherein the wrap assembly is configured to dispense the wrapping material from the wrap roll between the baler belt and the wrap floor belt; and wherein the engagement of the wrap floor belt to the baler belt drives the wrap material into the module forming chamber.

5. The module builder of claim 1, wherein the first drive system further includes a rear lower gate roller configured to engage and drive the main drive belt.

6. The module builder of claim 5, wherein the first drive system includes a drive sprocket coupled to a driven sprocket wherein the driven sprocket is rotationally coupled to the lower rear gate roller.

7. The module builder of claim 6, further comprising:

a tensioner configured to engage the main drive belt to tension the main drive belt in the engagement mode of operation.

8. The module builder of claim 7, wherein the tensioner is positioned partially between the drive sprocket and the driven sprocket.

9. The module builder of claim 5, wherein the second drive system includes an electric clutch configured to operationally engage the rear lower gate roller.

10. The module builder of claim 1, wherein the first drive system further includes a friction wheel configured to engage and drive the main drive belt.

11. The module builder of claim 1, wherein the first drive system includes at least one wrap box roller to engage and drive the main drive belt.

12. The module builder of claim 1, wherein the first drive system includes a plurality of interoperable gears to engage and drive the main drive belt.

13. The module builder of claim 1, wherein the first drive system includes a motor operably attached to engage and drive the main drive belt.

14. The module builder of claim 1, wherein the wrap floor belt includes a plurality of wrap floor belts that are operated by the first drive system.

* * * * *